United States Patent [19]
Zebley

[11] 3,757,950
[45] Sept. 11, 1973

[54] WASTE WATER TREATMENT PACKAGE PLANT HAVING A MODULAR DITCH MEMBER

[75] Inventor: Donald D. Zebley, Greenville, S.C.

[73] Assignee: Edward F. Connors, Edgewater, Md.

[22] Filed: Mar. 2, 1971

[21] Appl. No.: 120,188

[52] U.S. Cl............ 210/123, 210/14, 210/61, 210/62, 210/195, 210/199, 210/219, 210/256
[51] Int. Cl............................................. C02c 1/10
[58] Field of Search.................... 210/19.5, 3–8, 210/14, 195–197, 199, 256, 123, 61, 62, 219

[56] References Cited
UNITED STATES PATENTS

| | | |
|---|---|---|
| 3,421,626 | 1/1969 | Schramm et al............... 210/195 X |
| 3,337,454 | 8/1967 | Gruenwald...................... 210/62 X |
| 3,546,110 | 12/1970 | Englesson et al.............. 210/197 X |
| 3,677,409 | 7/1972 | Ferm et al..................... 210/221 X |
| 3,642,615 | 2/1972 | Wieferig........................... 210/7 |
| 2,901,114 | 8/1959 | Smith et al..................... 210/15 X |
| 3,169,921 | 2/1965 | Griffith........................... 210/15 X |

OTHER PUBLICATIONS

Burchinal, J. C., et al., Ditches Provide Efficient Treatment, Environmental Science & Technology, Vol. 3, Nov. 1969.

Primary Examiner—Michael Rogers
Attorney—Edward F. Connors

[57] ABSTRACT

A predetermined package plant for waste water treatment is constructed in a modular fashion for installation inside or outside a building structure and includes a substantially elliptical ditch that receives waste water after an initial grinding treatment thereof and which has a controlled aerator whereby a high rate primary aerobic treatment is effected. The ditch has a central supporting arrangement wherein a settler tank and a chlorination retention tank are mounted in separate, removable and side-by-side communicating fashion. The settler tank receives controlled overflow from the ditch and mechanically acts thereon to return sludge to the ditch and pass clear water on to the chlorination retention tank wherein the water is chemically treated in a time controlled manner by virtue of a water controlled flow arrangement therein and then aerated and recycled directly to the building structure for utility use, at least.

9 Claims, 8 Drawing Figures

Patented Sept. 11, 1973

INVENTOR
DONALD D. ZEBLEY

BY Edward F. Connore

ATTORNEY

Patented Sept. 11, 1973

INVENTOR
DONALD D. ZEBLEY

BY Edward F. Connors

ATTORNEY

Patented Sept. 11, 1973

INVENTOR
DONALD D. ZEBLEY

BY *Edward J. Connors*

ATTORNEY

WASTE WATER TREATMENT PACKAGE PLANT HAVING A MODULAR DITCH MEMBER

BACKGROUND OF THE INVENTION

1. Field of the Invention

This invention generally appertains to novel improvements in means and methods for the treatment of waste water and more particularly relates to a new and novel package plant and attendant process for the biological treatment of waste water at a building structure and the return to the structure of a clean effluent usable for utilitarian purposes, at least.

2. Description Of the Prior Art

At the present time and well into the coming decades the most serious problem caused by the spiraling growth of population and industry is and will be the treatment of waste water. Already the availability and operational efficiency of waste water treatment facilities has reached the cut-off point in many areas so that further development of such areas for dwelling and industrial usages is at a standstill.

Many such areas could be used for the erection and occupancy of dwelling and/or industrial buildings if sewage lines could be installed therefrom to existing sewage treatment plants or, on the other hand, if such plants could operate efficiently under an increased load. However, most often there are economic or technical factors that render the installation of necessary sewage piping or the structural and operational increase of treatment plants almost impossible. Also, many times the nature of the land or the geographical location of such areas render it impossible to connect the areas with existing treatment facilities or to build new facilities to handle such areas.

Some such areas have been used for building development by relying upon the installation and use of septic tank, soil absorption systems. But, in most areas, there is not sufficient open land spaces per building and occupants to support the necessary drain fields for the septic system or the nature of the ground is such that it cannot pass the required percolation tests for the installation of drain fields. In such instances, septic tanks may be installed but they are used merely as holding tanks that must be cleaned out periodically and the removed waste must be trucked to disposal stations. This is a very expensive and inconvenient procedure that is not satisfactory from any viewpoint.

Because of the many difficulties associated with the usage of septic tank systems, recent interest has focused on the utilization of waste water treatment systems operating on the aerobic principle as opposed to the anerobic principle on which the septic tank systems operate. In septic tank systems, air is excluded from the waste water and anerobic putrefaction is permitted to break down the waste water to a smelly effluent that is carried off for underground disposal by the drain fields or leech beds. Aerobic systems operate on a biological treatment of the waste water wherein the waste water is mixed with air to allow oxygen laden bacteria to break down the waste water into a clear effluent.

The most widely used aerobic system is in the form of an open air large basin dug out in the ground and sometimes reinforced with a concrete floor and within which a rotor operates to effect thorough mixing and aeration of the waste water flowing into such open air basin. Instead of or in consonant with such rotor, air pumps or air conveying piping are sometimes used to aerate the waste water in the basin. However, a rotor or the like mechanical agitator is preferred so as to keep the waste water in movement as well as to oxygenate it. From such basin, clear effluent flows to a disposal area and bacterial matter and solids are settled out.

Such known aerobic system, but its very nature, does not satisfy the standards of some authorities and, furthermore, such system is cumbersome and noisy and requires constant attendance and considerable maintenance. In addition, it operates at a high cost for its resultant production of an effluent that, while cleaner than that resulting from anerobic treatment, does not reach a standard whereby it could be useable for recycling purposes. And yet, it has been urged, of late, that the rapidly increasing rate of water usage will make it virtually necessary to reuse water, including waste waters.

SUMMARY OF THE INVENTION

The present invention has for its primary object the provision of a method and apparatus for treating waste water on the aerobic principle in a way so that the previously stated problems attendant with the known aerobic structures are obviated and so that such treatment is effected in a time-saving and reliable manner and at relatively low costs and with a minimum of maintenance, the latter leading to instrumentation for long periods of unattended operation.

A further object of the present invention is to provide a method and apparatus for the aerobic treatment of waste water which will result in the realization of an effluent that can be recycled directly for utility use, at least, and even for more sophisticated usages.

Another important object of the present invention is to provide a prefabricated aerobic unit that is built on a modular or building block principle so that it possesses great flexibility in servicing dwelling structures of any nature or size or any group thereof, with the same flexibility making it adaptable to a number of industrial waste disposal problems.

A further important object of the present invention is to provide an aerobic unit that is largely shop fabricated in modular components for easy field erection in a variety of circumstances and with the capacity of the unit being readily varied.

Generally stated, the present invention provides a modular ditch member that is molded from fiberglass in sections so that it can be erected at the site in various sizes presenting an effective aeration ditch or channel of needed width, depth and length, such having an active role with a paddle wheel operating in the ditch for effective mixing and aeration of the waste water entering the ditch the air entering the ditch through a duct in a closure lid for the ditch. The waste water enters the ditch through a grinder and grease trap arrangement and the grinder functions in association with a sump pump mechanism in the instance where the ditch is above ground and a direct gravity flow of the waste water into the ditch is not possible. The ditch is covered with the lid in either an above or below ground placement and it has a central body portion that defines the inner wall of the channel and serves as a supporting and mounting arrangement for a pair of separable and removable cylindrical tanks which are molded from fiberglass or a chemical resistant plastic.

One of the tanks, which is removably seated in an appropriate cavity in the central body portion of the ditch member, is a settler tank that receives a controlled overflow from the ditch or channel through a screening conveyance arrangement between the ditch and such tank. The settler tank is provided with a mechanical mechanism that removes sludge at the bottom of the tank and conveys it back to the ditch or channel to activate further treatment in the ditch and that removes clear water at the top of the tank and conveys it to the other tank which is a chlorination retention tank. The chlorination retention tank is provided with a water flow control arrangement, either possessing none or only a few working parts and, in either event, operating without any outside power source to control the passage of water therethrough so that it is properly chemically treated as by chlorination. From the latter tank the clear effluent is recycled directly back to the structure from whence the waste water originated and wherein it can be used for utility purposes, at least.

DESCRIPTION OF THE PREFERRED EMBODIMENTS

Figure 1:
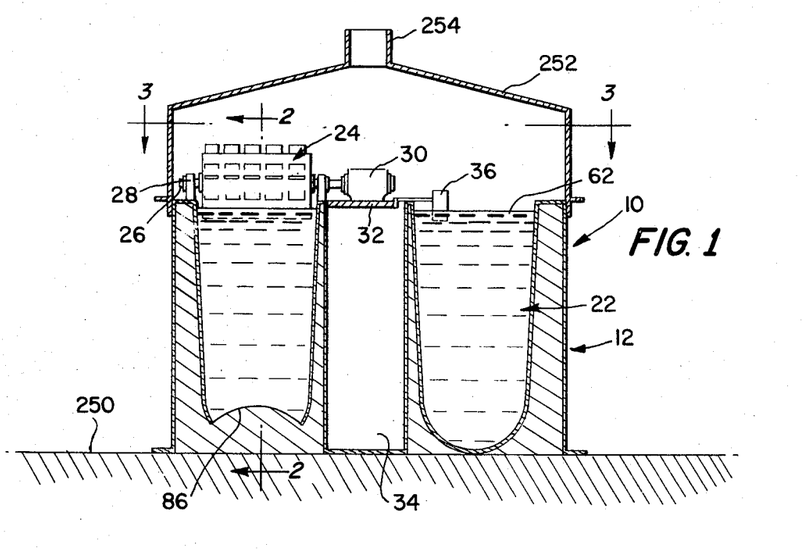
FIG. 1 is a vertical cross-sectional view of an aerobic unit constructed in accordance with the present invention.
Figures 3, 4, 5:
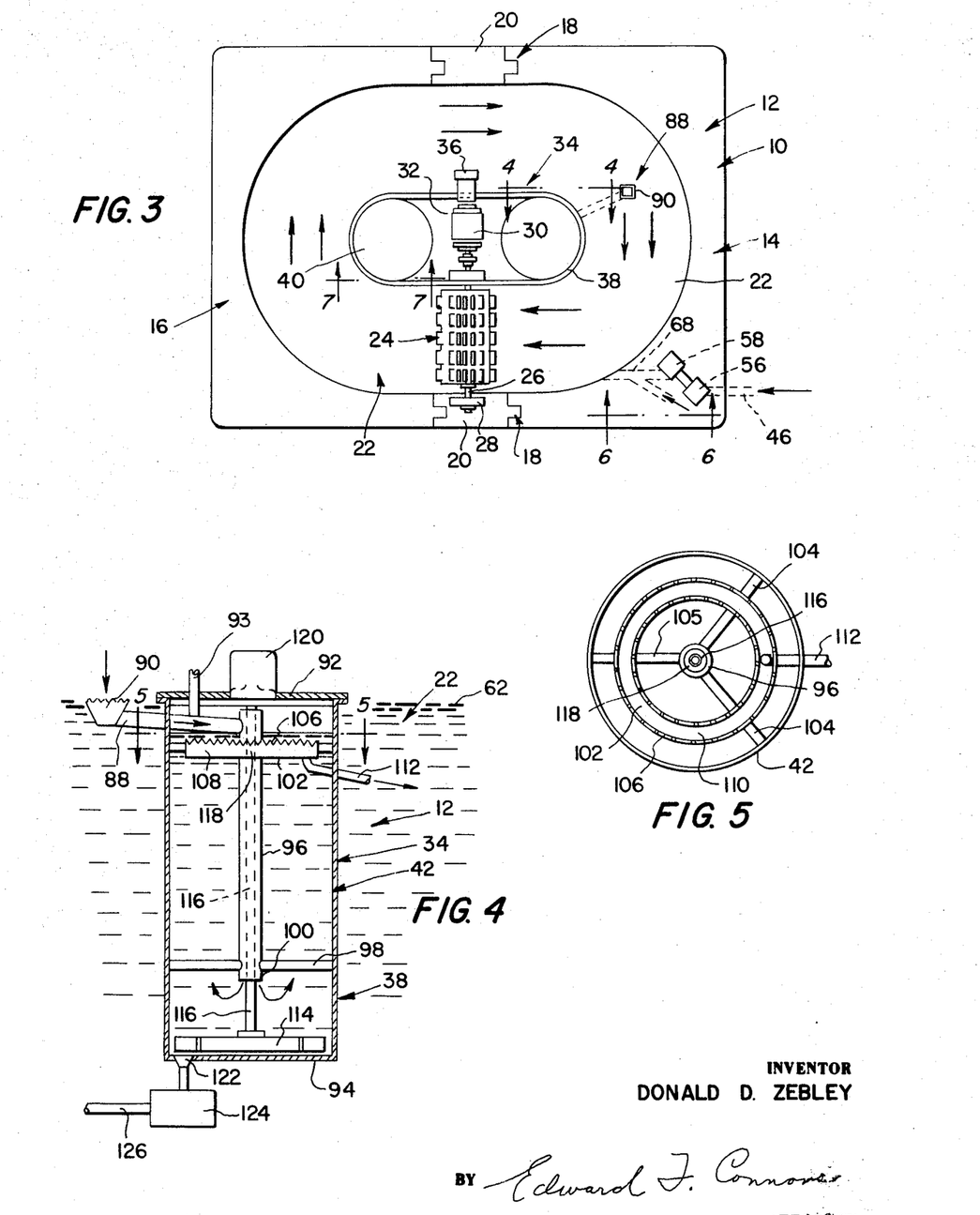
FIG. 3 is a top plan view of the unit with the hood cover or lid for the unit removed and is taken substantially on line 3—3 of FIG. 1.
FIG. 4 is a detailed vertical sectional view taken substantially on line 4—4 of FIG. 3 and showing in detail the construction and arrangement of the settler tank.
FIG. 5 is a horizontal cross-sectional view taken substantially on line 5—5 of FIG. 4 and showing in top plan the clear water overflow arrangement in the top of the settler tank.

Referring now more particularly to the accompanying drawings and initially to FIGS. 1 and 3, the reference numeral 10 generally designates the modular or building block aerobic unit of the present invention. The aerobic unit includes a ditch member 12 which is prefabricated from fiberglass or similar material, such as chemical resistant plastic. The fabrication of the ditch member 12 from a chemical resistant polyester resin reinforced with glass fibers is preferred because it offers corrosion and chemical resistance.

The ditch member 12 is prefabricated in molded sections so that it has end sections 14 and 16 that are joined directly together by an interlocking arrangement, such as a tongue and groove interlock 18 or are joined through the intermediary of a center section 20 with tongue and groove interlock, as shown, or a number of such center sections depending upon the desired length and width of the unit.

The ditch member in its erected condition defines an oval ditch or channel 22 which contains the waste water. The depth, length and width of such channel, which tapers downwardly from an open top to a closed arcuate bottom, is dependent upon the desired capacity of the unit. Thus, the ditch or channel geometry varies in relation to the handled quantity and feed rate of the waste water and amount of effluent removed per volume on a daily or other set basis.

In any event, the channel 22 is elliptical or over shaped in top plan view and has tapered inner and outer sides with a rounded bottom. The outer bottom wall of the ditch member is adapted to be seated on the ground surface exteriorly of a building structure or on a floor surface interiorly of the building structure, as shown. It is also intended that the unit can be buried in the ground either inside or outside of the building structure.

The waste water in the channel or ditch 22 is kept moving in a clockwise direction and is admixed with air by an aerator paddle wheel 24. The aerator paddle wheel 24 lies transversely across one side of the channel at the open top thereof and has the lower portion of its periphery immersed in waste water. The outer end of the shaft 26 carrying the paddle wheel is mounted in a bearing block 28 on the side of the top of the ditch member while the inner end of the shaft is coupled to the drive shaft of a drive motor 30 which is mounted on a support plate 32 that straddles the center body portion 34 of the ditch member.

A flow control member 36 lies on the other side of the channel in control connection with the motor 30 and functions to turn the motor on and off in response to the velocity of flow of the waste water. The thusly controlled paddle wheel keeps the waste water constantly moving so that solids are always suspended and aerates the waste water which oxygenates the water and keeps the bacteria alive and working. The waste water ideally moves in a current speed of 30 feet per minute (approximately) as a maximum to 3 feet per minute (approximately) as a minimum.

The oval shaped center body portion 34 of the ditch member defines the inner side wall of the channel and also constituting a mounting and supporting arrangement in the form of a pair of spaced apart cylindrical vertical cavities 38 and 40 which provide housings for the settler tank 42 and the chlorination retention tank 44, as will be described.

Figure 6:
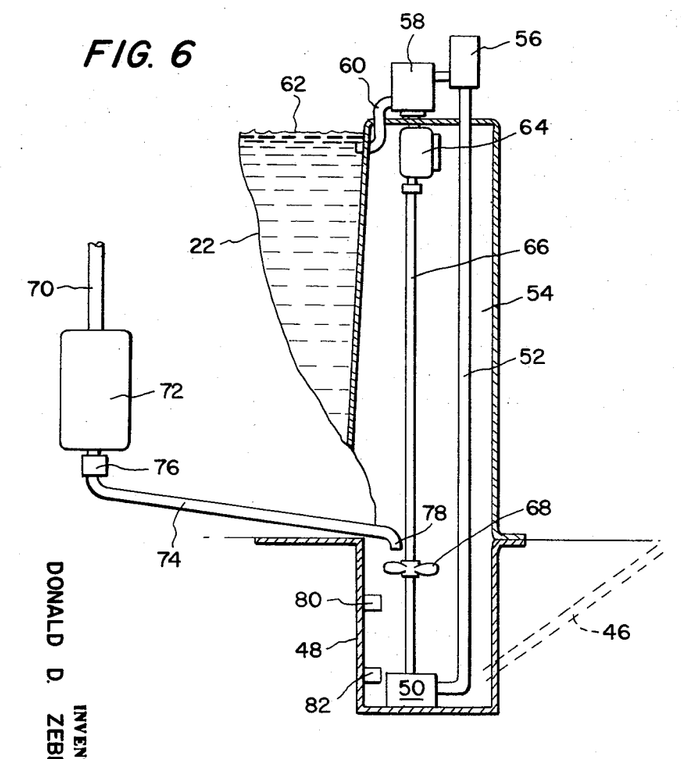
FIG. 6 is a detailed vertical sectional view taken on line 6—6 of FIG. 3 and showing in vertical elevation and section the sump intake arrangement for feeding waste water into the ditch when the ditch is mounted at or about ground level.

In the instance where the unit 10 is mounted above ground on a supporting ground or floor surface, the waste water from the associated building structure flows by gravity through an inlet pipe 46 for incoming raw sewage or waste water into a sump 48 that is molded from fiberglass as a separate section and attached to the bottom of the ditch member exteriorly of the channel and is embedded in the ground, as shown in FIG. 6. The inlet pipe conveys the waste water from the building structure to the sump where a pump 50 is operatively housed. The pump 50 communicates with a vertical delivery pipe 52 that is housed in a housing 54 formed in a portion of the solid outer wall of the ditch member, as shown in FIGS. 3 and 6.

The upper end of the delivery pipe 52 communicates with a grease trap 56 in advance of a grinder 58 from which an outlet elbow pipe 60 extends to the channel at a point just below the surface level 62 of the waste water as shown in FIG. 6.

The grinder 58 is driven by a geared drive motor 64 which also drives the drive shaft 66 for the sump pump 50 with the shaft 66 extending vertically in the housing 54 and carrying a cleaning paddle 68 on its lower end portion so that the cleaning paddle 68 is operatively positioned horizontally in the sump 48 at the lower end of the housing 54.

The fan type cleaning paddle 68 works with a cleaning spray in the sump 48 at the end of each pumping cycle so as to clean the sump thoroughly. In this respect there would never by any waste water, as such, standing in the sump portion because of the cleaning action of the paddle 68 in cooperation with an intake of clean effluent from the chlorination retention tank 44. The clean effluent is conveyed as a bleed off from the tank 44 by the conduit 70 to a holding tank 72 disposed above the sump portion. An outlet pipe 74 is connected to the holding tank 72 by a solenoid release valve 76 and has a lower discharge end 78 that overlies the paddle 68 to discharge clear effluent on the paddle as it is rotating.

Upper and lower limit switches 80 and 82, respectively, are mounted in the sump section to control the operation of the motor 64 and the cleaning operation of the cleaning means defined by the clear effluent and the spray or cleaning paddle 68.

The waste water entering the sump 48 through the inlet pipe 46 from a building structure builds up therein until it reaches the set height of the upper limit switch 80 whereupon it activates the switch to start the motor 64 that drives the pump shaft and the grinder. The pump and grinder are set in simultaneous operation and the waste water is carried up through the delivery conduit 52 to the grinder and therefrom it spills into the channel through the elbow pipe 60.

The bottom switch 82 is activated by the lower level of the waste water following operation of the sump pump and activates the release valve 76 to permit the gravitational discharge of the clean effluent from the holding tank 72 into the sump portion with the liquid spilling over the rotating spray paddle or fan 68. The bottom switch, when activated, shuts off the motor 64 but the same has a built-in timer that permits it to continue to operate for a short period of time which is sufficient to enable the spray paddle 68 to clean out the sump portion with the incoming clean effluent and to permit the sump pump 50 to pick up such cleaning fluid and convey it up to the channel through the delivery conduit 52.

Figure 2:
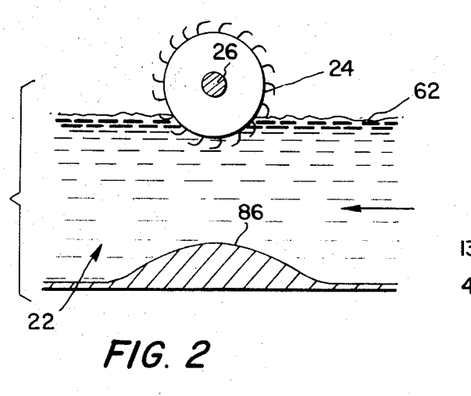
FIG. 2 is a detailed vertical sectional view taken substantially on line 2—2 of FIG. 1 and showing the formation of the ditch or channel bottom at the point underlying the aerator paddle wheel.

The waste water from the inlet pipe 60 is kept in motion in the channel by the aerator paddle 24. In order to improve the mixing and aeration action the inside bottom wall of the ditch or channel 22, immediately below the aerator paddle, is shaped in an upwardly curved or humped manner to present an upstanding arcuate bulge 86, as shown in FIG. 2, below the aerator. In this regard, a high width/depth of the channel would create considerable area for a given volume but might not insure complete solid suspension while a low width-/depth could result in a solid settlement at the bottom of the channel so as to interfere with a high rate aerobic action. To improve the mixing and movement of the waste water, the raised bottom portion 86 below the aerator paddle wheel 24 is provided.

The waste water remains in constant agitated and airadmixed clockwise movement in the entire depth and width of the ditch or channel 22 with the cleaner and clearer water being at the upper level 62. This constitutes a primary step of the process and is a high rate aerobic action.

As incoming waste water enters the channel through the sump pump delivery arrangement of FIG. 6 or, in the instance of a buried unit, by gravity flow, an overflow portion of the water leaves the channel through an overflow pipe 88, as shown in FIGS. 3 and 4. The overflow pipe 88 has a rectangular open mouth portion 90 provided with serrated or toothed upper edges on the side walls thereof so as to screen out solids. The open mouth portion faces upwardly in the channel about at the level of the waste water in the channel. The overflow pipe 88 leads to the settler tank 42, as shown in FIG. 4, and conveys the overflow of the waste water from the channel where the primary aerobic process is effected to the settler tank wherein the secondary process of the present invention is commenced.

The settler tank 42 is an open mouth cylindrical tank molded in one piece from fiberglass and adapted to be removably seated in the cavity 38 in the center body portion 34 of the ditch member 12. The tank is closed off from the ditch by a closure lid 92 seated on its open upper end while the flat bottom end 94 of the tank seats on the bottom of the supporting cavity 38. The lid has an air pipe 93 that extends well above the water level in the ditch 22. A tubular element or pipe 96 is held vertically within the center of the settler tank by support arms 98 that radiate inwardly from the inner surface of the side wall of the tank to a fixed connection with the pipe 96 adjacent the open lower end 100 thereof with such end 100 being held above the interior of the bottom wall 94. The fixedly located pipe has its upper end disposed immediately below the lid 92 and therebelow the overflow pipe 88 communicates with the pipe or tubular member 96. The overflow pipe 88 extends through the upper portion of the side of the settler tank just below the upper end thereof so that the overflow effluent from the channel flow into the pipe 96 and out from the open lower end 100 thereof into the lower end of the settler tank 42.

Figure 7:
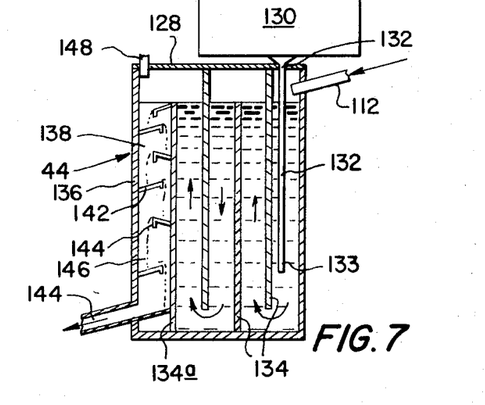
FIG. 7 is a detailed vertical sectional view taken substantially on line 7—7 of FIG. 3 and showing in vertical section the interior of the chlorination retention tank.

A circular overflow trench 102 is fixedly circumposed about the upper end portion of the pipe 96 and is held in horizontal position by fixed supports 104 radiating from the tank wall and internal radial supports 105 radiating from the upper end portion of the pipe 96. The overflow trench 102 is channel shaped in crosssection and the upper edges 106 of the spaced side walls 108 thereof are serrated or toothed for screening out any particles from entry to the interior of the trench. The bottom wall 110 of the trench is provided with an outlet pipe 112 that extends from the settler tank to convey clean water overflow to the chlorination retention tank 44, as shown in FIGS. 4 and 7. A horizontally disposed stirrer paddle 114 is rotatably mounted within the settler tank just slightly above the interior of the bottom wall 94 of the settler tank for slow movement to keep the settling sludge in movement and flowable. The paddle is slowly rotated by a shaft 116 which is rotatably journaled in the pipe 96 and is supported within the pipe by bearings 118. A small drive motor 120 for the shaft 116 is carried by the lid 92. The bottom wall 94 has a vertical drain 122 for the sludge that gravitates from the tank 42 to a sump 124 which returns the sludge to the channel 22 through a return conduit 126. The paddle wheel serves as an agitator or stirrer to prevent the settling sludge from caking or compacting and to keep it pumpable so that it gravitates into and is acted upon by the pump 124. Such sludge is returned to the channel by the return conduit 126 that exits in the ditch or channel just at the aerator wheel 24 so that the returning sludge is immediately upon its return in the ditch mixed in with the waste water in the ditch or channel.

The overflow pipe 112 from the overflow trench 102 at the top portion of the settler tank 42 leads to and communicates with the chlorination retention tank 44, as shown in FIGS. 3 and 7. As shown in FIG. 7, the tank 44 is molded in cylindrical shape from fiberglass and is similar in shape and size to the tank 42. The pipe 112 from the settler tank enters the tank 44 through the side wall and adjacent the open upper end which is sealingly closed off by a removable lid 128 which supports an automatic chlorination tank and timed dispensing unit 130 having an outlet pipe 132 vertically entering the open end of the tank 44. Starting at the side where the effluent delivery pipe 112 enters the tank a series of radially arranged, vertically disposed baffle plates 134 is provided in the tank. The baffle plates are spaced apart in one radial direction of the tank and extend the full interior width of the tank in the transversely or opposite radial direction and they have their opposing upper and lower ends in staggered arrangement with respect to the top and the bottom wall of the tank so that they define a baffled tortuous flow path for the effluent in the tank for the purpose of positively delaying the flow of the effluent through the tank. The baffle plates provide a controlled flow of the effluent so that a predictable retention of the effluent in the tank 44 is realized. The chlorine or similar treating chemical enters the tank 44 through the pipe 132 in a metered fashion and comes into intimate contact with the effluent with the pipe having its outlet 133 well submerged in the tank. The effluent admixed with chlorine is retained by the baffle arrangement in the tank for a period of time sufficient to achieve complete chlorination of the effluent. This is accomplished without the use of any moving parts and without using any power source.

At the side of the tank opposite the inlets for the effluent and the treating chemical the last baffle 134a cooperates with the interior of the adjacent side wall portion 136 to provide an aerating outlet chamber 138 for the effluent. Such vertical chamber terminates in an outlet drain 140 that leads to a return piping for carrying the effluent back to the building structure.

The aerating vertical outlet chamber 138 is provided with a series of ledges 142 arranged in staggered vertically spaced and overhanging relation and projecting relative to each other from the baffle 134a and the tank side wall portion 136. The ledges are slanted upwardly and have outer free edges provided with depending lips 144 so that they constitute a series of waterfalls with the effluent cascading over and down the vertically staggered ledges to entrap air therein. In this fashion, after chlorination for a sufficient time, the effluent is released to the return pipe 140 in a series of waterfalls that achieve an aeration effect. Air is admitted to the aeration chamber 138 within which the ledges are arranged through an air pipe 148 provided in the lid above the chamber 138.

Figure 8:
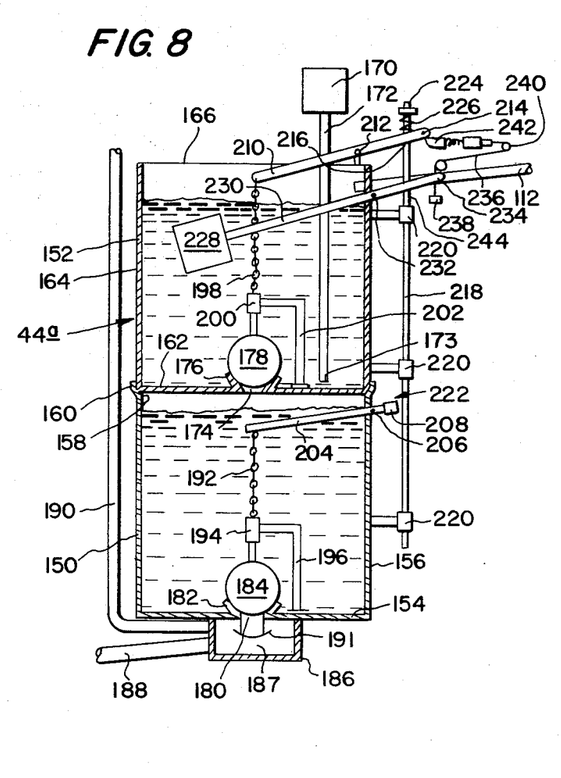
FIG. 8 is a vertical cross-sectional view of a modified form of chlorination retention tank.

A modified form of chlorination retention tank is shown in FIG. 8 wherein the tank 44a is composed of two cylindrical tank sections 150 and 152 arranged one on top of the other. The tank sections are molded from fiberglass with the lower tank section 150 having a closed bottom wall 154, a round side wall 156 and an open top 158 defined by an outwardly turned lip 160 on the upper edge of the side wall 156. The lip 160 provides an internal shoulder for seating the bottom 162 of the upper tank section that has a side wall 164 and a top 166 that can be closed off by a suitable cover.

A chlorine tank 170 with a metered outlet leading to a depending outlet pipe 172 is provided above the upper tank with the pipe 172 depending well within the interior of the upper tank. The bottom wall 162 of the upper tank has an opening 174 communicating the interior of the upper tank with the lower tank. A valve seat 176 for a ball valve 178 encompassingly upstands from the opening 174 and the ball valve 178 is normally seated in the seat 176 to close off the opening 174. The submerged outlet end 173 of the pipe 172 is disposed below the top of the valve seat 176.

The lower tank has an outlet opening 180 encompassed by a valve seat 182 for a ball valve 184 with the opening leading to a box 186 having an outlet drain 188 for returning the effluent to the building structure. An air pipe 190 communicates with the box 186 and an aerator disc 191 is disposed in the box and underlies the outlet opening 180 through which the effluent gravitationally falls. The box 186 defines an aeration chamber 187 with the spill-over disc 191 and the admitted air supply from the air pipe 190 causing the effluent to be aerated after it leaves the lower tank 150.

The ball valve 184 is activated by a chain 192 guided in a sleeve 194 which is supported in a proper vertical position by an arm 196. Similarly, the ball valve 178 is actuated by a chain 198 guided in a vertical sleeve 200 supported by an arm 202.

The chain 192 is carried by a pivoted actuating lever 204 pivoted on the tank wall, as at 206, and having an outer latch end portion 208. The chain 198 is carried by a lever 210 pivoted on the upper end of the tank, as at 212, and having an outer end portion 214. Adjacent the outer end portion 214 the lever is fitted over, as at 216, a vertical push rod 218.

The push rod 218 is slidably disposed in vertically oriented support collars 220 carried by the outer side walls of the tanks 150 and 152 and is provided with a nub 222 adapted to strike the latch end 208 of the lever 204 in the downward movement of the rod and thereby unseat the ball valve 184.

The upper end of the rod 218 has a stop 224 under which a compression spring 226, that is coiled around the upper end of the rod, seats with the spring bearing against the upper face of the outer end portion 214 of the lever 210.

A float 228 is disposed in the upper tank 152 and is carried by an arm 230 which is pivoted, as at 232, on the tank and which has a vertically apertured outer end portion 234 through which a cable 236 is passed with the cable having a lower end provided with a stop 238. The cable is entrained over a series of pulleys 240 and actuates a spring urged dog 242 that underlies and acts on the outer end portion 214 of the lever 210. The float arm is pivotally attached, as at 244, to the push rod 218.

The inlet pipe 112 from the settler tank constantly delivers the effluent to the upper tank 152 with the valved arrangement between the tanks functioning to retain the admitted effluent in the upper tank 152 until it is properly admixed with the chlorine from the chlorination outlet pipe 172 that extends all the way down to a point close to the inside of the bottom wall of the upper tank 152.

Considering the upper tank 152 to have just been emptied, the lower tank 150, of course, has just been filled. This leaves the float 228 in its extreme downward position with the ball valve 178 becoming seated. As the effluent continues to enter the tank 152 with the ball valve 178 seated, the effluent causes the float 228 to rise.

When the float has traveled approximately 75% of its full upward motion, the float arm 230 through its pivot connection 244 with the push rod 218 has moved the push rod downwardly an equal distance. At this point, the nub 222 on the push rod contacts the end portion 208 of the lever arm 204 and thereby raises the ball valve 184. The effluent in the lower tank has already been treated with chlorine in the upper tank and it spills out through the opening 180 over the bowl-shaped aerator disc 192 into the air in the chamber 187. Such aerated effluent enters the drain pipe 188 whereby it is recycled directly to the building structure. The tank 152 continues to fill up with the incoming effluent and incoming chlorine mixing together in a time delayed manner. The ball valve 178 is seated and when the effluent leaves the tank 150 the ball valve 184 drops back onto its seat.

As the float 228 continues to rise in the tank 152, the push rod 218 is continued to be moved downwardly, thereby placing the spring 226 under potential force. At the instant the float reaches its full upward travel, the float arm 230 acts on the cable stop 238 to pull the cable 236 and release the dog 242 from its latching position under the lever 210. The spring drives the outer portion 214 of the lever downwardly to raise the ball valve 178 and permit the effluent to flow from the upper tank to the lower tank.

It can be appreciated that the operation of the unit 10 is simple and requires a minimum of outside source of energy. The unit adapts itself to a minimum of maintenance and lends itself quite naturally to instrumentation control for long periods of time. The unit possesses simplicity and versatility for installation at any place and in or with any type or group of structures.

In essence, the unit effects a high rate primary aerobic treatment of the waste water in the ditch or channel 22 followed by a secondary mechanical settler and chemical treatment under a controlled manner with the result that an effluent ready and fit for direct recycling to the building structure is produced.

The ditch member may be left open and concealed by a screening shrubbery when the ditch member is placed outdoors. However, it is envisioned that it will be most usually placed inside a building structure on a floor surface 250, as shown in FIG. 1. In such placement, a hood 252 is provided for the ditch member with the hood covering the ditch 22 and rising thereabove and being provided with a vent stack 254 whereby the unit can be vented to the exterior and outside air can be brought into the unit.

While the best known form of the invention, in both its apparatus and process aspects, has been shown and described herein, it can be appreciated, as in the instance of the chlorination retention tank embodiment, that other structural forms and working processes can be realized as come within the spirit of the claimed invention so that limitation is to be considered not by the Abstract or the drawings and description, but solely in accordance with the spirit and scope of the appended claims.

I claim:

1. A waste water treatment package plant comprising a modular ditch member formed from corrosion and chemical resistant material and provided with a substantially oval ditch, means for conveying waste water to the ditch, means in the ditch for constantly circulating and aerating the waste water therein, said modular ditch member having a central body portion defining the inner side wall of the ditch and provided with supporting means, a settler tank mounted in the supporting means and encompassed by the ditch, a chemical treatment tank mounted in the supporting means adjacent to the settler tank and encompassed by the ditch, means for conveying to the settler tank from the upper level of the waste water in the ditch as overflow a portion of the waste water, means in the settler tank for separating water as effluent from particles as active sludge back to the ditch, means for conveying the effluent from the settler tank to the chemical treatment tank, means in said chemical treatment tank for admixing the effluent with a chemical, means for automatically retaining the admixed chemical and effluent in the tank for a predetermined period of time and discharging it after a time lag from inlet of the effluent to outlet of the effluent from the tank, and means for automatically aerating the effluent as it is being discharged from the tank for direct recycling.

2. The invention of claim 1 wherein said ditch member is prefabricated from fiberglass.

3. The invention of claim 1 wherein said ditch member is formed in mating sections.

4. The invention of claim 1 wherein said central body portion is provided with mounting cavities that constitute the supporting means and within which the settler tank and the chemical treatment tank are removably seated.

5. The invention of claim 1 wherein said means for conveying waste water to the ditch includes a sump portion connected to the ditch member and into which waste water from a structure flows, pump means for delivering the waste water from the sump portion to the ditch, and means for washing out the sump portion after each delivery of waste water therefrom with clear effluent from the chemical treatment tank.

6. The invention of claim 1 wherein said chemical treatment tank is a chlorination retention tank having means for metering chlorine into the effluent housed therein, and said retaining means includes intercommunicating chambers in such tank through which the admixed chlorine and effluent flow in a controlled and delayed manner.

7. The invention of claim 6 wherein said last means includes an aeration chamber having a baffle means against which the outflow of effluent from the treatment tank impinges, and means for conveying air to said chamber for mixing with the effluent as it impinges on the baffle means.

8. The invention of claim 1 wherein the chemical treatment tank is a chlorination retention tank having separate adjoining tank chambers provided with intercommunicating means, valve means controlling said intercommunicating means and means responsive to a build-up of effluent in said tank chambers for actuating said valve means and means for conveying air to at least one of the tank chambers.

9. The invention of claim 8, wherein said tank chambers are arranged one above the other as an upper and lower chamber, each of said chambers having a bottom wall provided with an outlet, ball alves constituting said valve means being seated in said outlets and said actuating means including a float assembly disposed in at least one of the chambers and having means connected to said ball valves for unseating them when the liquid level rises to a certain point in the chambers.

* * * * *

UNITED STATES PATENT OFFICE
CERTIFICATE OF CORRECTION

Patent No. 3,757,950                    Dated September 11, 1973

Inventor(s)  Donald D. Zebley

It is certified that error appears in the above-identified patent and that said Letters Patent are hereby corrected as shown below:

Line 1 of the Abstract, "predetermined" should read --prefabricated--.

Column 2, line 7, "but" should read --by--.

Column 10, line 26, after "sludge" it should read --and returning such sludge--;

Column 10, line 26, after "ditch" and before the comma (,) it should read --for recirculation and treatment therein--.

Column 12, line 2, "alves" should read --valves--.

Signed and sealed this 9th day of April 1974.

(SEAL)
Attest:

EDWARD M. FLETCHER, JR.            C. MARSHALL DANN
Attesting Officer                  Commissioner of Patents